INVENTOR.
PHILIP M. CRUSE,
BY John M. Koch
ATTORNEY.

INVENTOR.
PHILIP M. CRUSE,
BY John M. Koch
ATTORNEY.

United States Patent Office 3,316,404
Patented Apr. 25, 1967

3,316,404

INFRARED DETECTING SYSTEM HAVING A MEMORY CIRCUIT UTILIZING A DIFFERENTIAL AMPLIFIER

Philip M. Cruse, Santa Barbara, Calif., assignor to Santa Barbara Research Center, Goleta, Calif., a corporation of California Filed June 1, 1964, Ser. No. 371,648
5 Claims. (Cl. 250—83.3)

This invention relates to an electronic memory circuit, and particularly to such a circuit for use with a photosensitive detector, especially an infrared detector testing system, such as the system disclosed in copending application Ser. No. 371,488, filed June 1, 1964 by Harold K. Coulter, Philip M. Cruse and Daryl D. Errett.

In such systems it is desirable to measure the peak amplitude of a voltage in the form of random pulses, continuous waveforms, etc., and to retain the peak measured amplitude until discharged on command. It is desirable, in circuits of such systems which employ capacitors to be charged, that the time for charging the capacitor to the signal voltage being tested be a minimum. It also is desirable that the memory time be of adequate duration, that the output voltage of the memory circuit be an accurate measure of the tested input voltage and that the effects of temperature and power supply variations be minimized.

Accordingly, it is an important object of this invention to provide an improved memory circuit employing a diode and a capacitor, wherein the capacitor is charged up to a peak signal voltage at a minimum effective charging time constant.

Another object of this invention is to provide an improved memory circuit employing a diode, capacitor and field effect transistor wherein the memory time is greatly increased for a given set of diode, field effect transistor and capacitor values, over the memory time of prior art memory circuits.

A further object of this invention is to provide an improved memory circuit wherein the effects of temperature and power supply variations are markedly reduced, over those of prior art memory circuits.

Additional objects will become apparent from the following description of the invention, which is given primarily for purposes of illustration, and not limitation.

Stated in general terms, the objects of this invention are attained by providing a memory circuit employing an input diode coupled to a charging capacitor and to a transistor, preferably a field effect transistor, wherein an input voltage passes through the diode and charges the capacitor, and, upon removal of the signal voltage, the capacitor cannot discharge through the diode or the transistor. A differential amplifier, incorporating a mode of feedback from the output of the diode, capacitor and transistor circuit is incorporated in the memory circuit, as described in more detail below with reference to the accompanying drawings, wherein:

Figure 1:
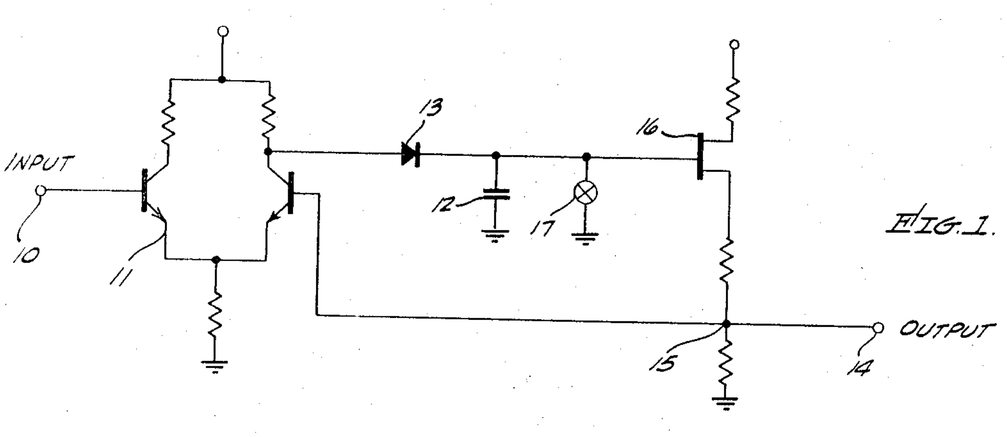
FIG. 1 is a circuit diagram showing a specific embodiment of the basic circuit of the invention.

In the circuit of FIG. 1, a positive electrical signal applied at the input 10 of the differential amplifier 11 causes an unbalanced condition to exist in the differential amplifier. The signal voltage is greatly amplified before it charges the capacitor 12 through the diode 13. Because of this signal amplification, the charging rate of capacitor 12 is greatly increased. Without any other restrictions, capacitor 12 would charge up to a value many times greater than the signal voltage applied at input 10. Therefore, as the voltage of capacitor 12 approaches the input signal voltage, the series resistance of diode 13 is not increased significantly and does not slow the rate of charging capacitor 12, which then can follow the signal input voltage very closely. As capacitor 12 is charging up, the output voltage of the circuit at output 14 follows the progress of the charging process. The output voltage is fed back from point 15 to differential amplifier 11. When the output voltage equals the input signal voltage, differential amplifier 11 cuts off any further charging of capacitor 12.

After the input signal is removed and the circuit is in memory mode, capacitor 12 cannot discharge back through diode 13 or field effect transistor 16, except for extremely small leakages in the diode and field effect transistor. Such leakages determine the length of memory for the circuit. Any decay in the voltage of capacitor 12 is fed back to differential amplifier 11, which then acts as a single stage amplifier. It amplifies and inverts so that capacitor 12 is recharged. The improvement in memory time is a function of the gain of this feedback loop. Effects of temperature and power supply variations are compensated for in the same manner. Switch 17 discharges the circuit when the memorized voltage is no longer needed. Because of the power gain in field effect transistor 16, the memorized voltage can be monitored without discharging capacitor 12.

The memory circuit of this invention is especially useful for measuring and holding transient peak voltages, and can be used to quickly find the most sensitive spot on an infrared detector by mechanically scanning the detector with a small spot, as described in the copending application Ser. No. 371,488, to which reference was made hereinabove. The peak signal voltage derived during the scanning operation is set on a meter scale as unity. Rescanning of the detector for contours of 0.9, 0.8, 0.7, etc. are easily accomplished.

The memory circuit of the invention possesses several advantages. It shortens the time required for charging the capacitor to the signal voltage. In prior art circuits, as the capacitor approaches the level of the signal voltage, the voltage drop across the diode decreases. With this decrease, the diode series resistance increases markedly. Increased diode resistance, in turn, increases the effective charging time constant.

In the memory circuit of the invention, the memory time is greatly increased for a given set of diode, field effect transistor and capacitor values. Effects of temperature and power supply variations are markedly reduced as compared to prior art circuits. Furthermore, in the memory circuit of the invention, the output voltage is an accurate measure of the peak input voltage. Diode and field effect transistor turn-on voltages are washed out in the circuit of the invention.

Figure 2:
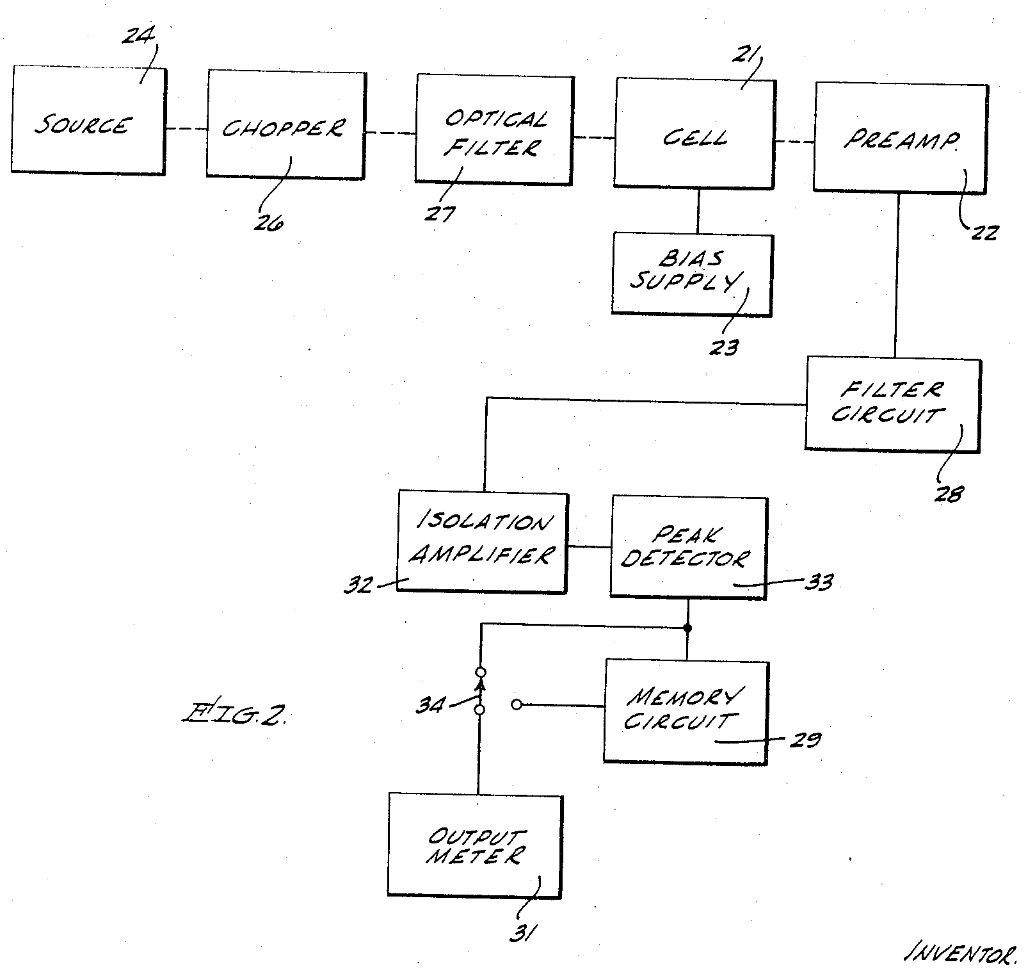
FIG. 2 is a schematic block diagram showing an infrared detector testing system employing the memory circuit of the invention.

A more detailed description of the use of the circuit of this invention in a photosensitive detector testing system is given below with reference to FIGS. 2 and 3. The electronic system shown schematically in FIG. 2 is capable of providing high linear amplification of the output of cell 21 through preamplifier 22, and of supplying bias through bias supply 23. The output of cell 21 is achieved through the use of an infrared source 24 equipped with a synchronous chopper 26 which interrupts the energy from source 24 at a rate of about 810 c.p.s. An optical filter 27 is used to prevent diffraction limiting at the larger energy wavelengths. The output from preamplifier 22 is amplified and filtered in filter circuit 28 at the chopping frequency before being rectified and held in the memory circuit 29 or presented on the output meter 31. Isolation amplifier 32 serves to isolate filter circuit 28 and produce sufficient dynamic range to operate peak detector circuit 33. Peak detector circuit 33, in turn, rectifies carrier signals for presentation to memory circuit 29 or to output meter 31. Switch 34 determines if output meter 31 reads the instantaneous carrier signal value or the maximum signal produced over peak detector circuit 33 as found stored in memory circuit 29.

As each cell 21 is scanned for the first time, memory circuit 29 holds the maximum output signal presented to it. This permits the operator to resist the system gain for a convenient meter reading and proper overall dynamic range. Memory circuit 29 is switched out and a contour plot is made using the 100%, 90% and 10%, or any other cardinal response points of cell 21 for plotting equipotential lines or areas.

Basically memory circuit 29 enables the operator, when making sensitivity contour measurements on an infrared cell 21, to find the most sensitive spot on the cell by very rapidly scanning the whole cell area. Memory circuit 29 retains the maximum point on a meter 31. The operator is able to adjust the gain of the system so that the most sensitive spot on cell 21 has a unity scale factor on output meter 31. All other output readings from cell 21 will be lower than this one value and will read directly in percent of the most sensitive spot on the cell.

Figure 3:
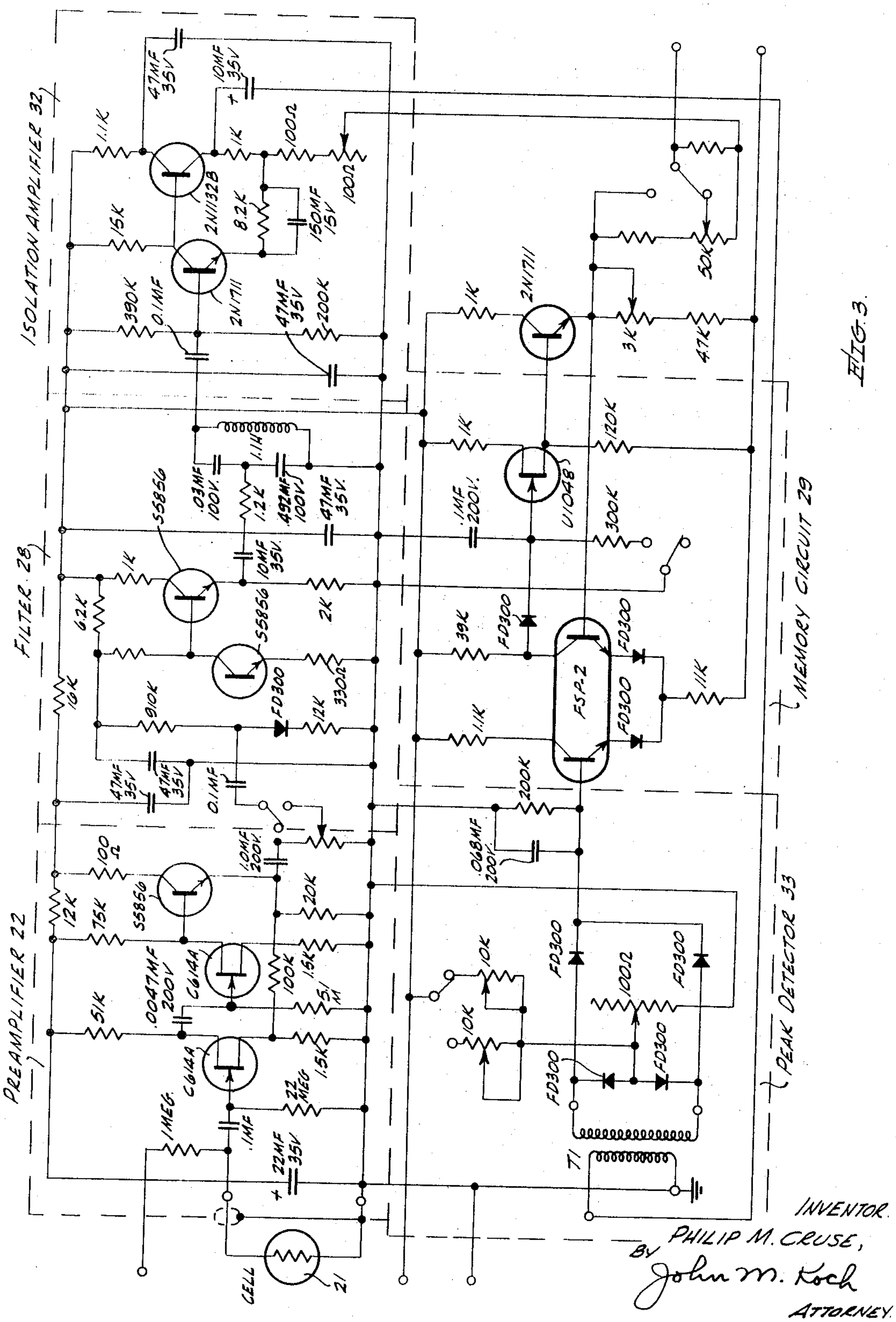
FIG. 3 is a complete circuit diagram of the circuit of FIG. 2.

FIG. 3 shows a detail circuit diagram of the electronics involved with such a contour test set. Memory circuit 29 follows peak detector 33 isolation amplifier 32, narrow band filter 28 and preamplifier 22. Memory circuit 29 is an integral part of the overall electronics system and simplifies the data reduction to a matter of merely recording or plotting the output voltages read directly on meter 31 and generating the contours continuously as the cell 21 is scanned. Without memory circuit 29 the signal output readings from the system would have to be recorded first, evaluated to find the highest signal output, call this point 100% and then compute all other values recorded relative to the 100% point. From this converted data a contour map and intervals and percentage increments then can be drawn. Memory circuit 29 essentially permits all of this computational work to be done within the electronics system.

Obviously many other modifications and variations of the present invention are possible in the light of the above teachings. It is therefore to be understood that within the scope of the appended claims the invention can be practiced otherwise than as specifically described.

What is claimed is:

1. A memory circuit which comprises an infrared detector cell; a preamplifier circuit coupled to said cell for receiving the output of the cell and linearly amplifying, and chopping the output of said cell; a filter circuit coupled to said preamplifier circuit for amplifying and filtering the output of the amplifier circuit at the chopped frequency; an isolation amplifier circuit coupled to said filter circuit for isolating the filter circuit and operably providing sufficient dynamic range; and a peak detector circuit coupled to said isolation amplifier circuit for generating rectified input carrier signals; a transistorized differential amplifier for receiving an input carrier signal voltage, a diode coupled to the differential amplifier for passage through the diode of an amplified input signal voltage, a capacitor coupled to the diode for charging the capacitor to a voltage substantially equal to the input signal voltage, a field effect transistor coupled to the diode and the capacitor so that the capacitor is substantially prevented from discharging back through the diode and through the field effect transistor so that the circuit serves as a voltage memory for the input signal voltage, and a feedback conductor coupled to the field effect transistor and to the differential amplifier to feed an output voltage from the field effect transistor to the differential amplifier so that when the feedback voltage equals the input signal voltage the differential amplifier is balanced and passage of amplified input signal voltage through the diode is cut off so that the voltage memorized by the circuit can be monitored substantialy without discharging the charged capacitor.

2. A circuit device comprising:

a differential amplifier means having a first input terminal, a second input terminal and an output terminal, said differential amplifier being adapted to receive an electrical signal on said first input terminal and being operable to amplify the input signal and pass the amplified signal to said output terminal;

a storage means including a capacitor;

a unidirectional conducting means coupled to conduct the amplified electrical signal from said differential amplifier to said storage capacitor for charging said storage capacitor to develop a storage signal thereacross;

means having a high input resistance coupled to receive the electrical storage signal developed across said storage capacitor and being operable to generate an output signal having an amplitude proportional to the instantaneous amplitude of the stored signal;

a feedback means coupled between said means having a high input resistance and said second input terminal and said differential amplifier for feeding back an electrical signal having an amplitude equal to the instantaneous amplitude of the storage signal, the fedback signal being operable to cut off the amplified signal on said output terminal of said differential amplifier when the amplitude of the stored signal equals the amplitude of the electrical signal received at said first input terminal and for turning on said differential amplifier when the amplitude of the stored signal is below the amplitude of the input signal.

3. The circuit of claim 2, in which said means having a high input resistance is transistor.

4. The circuit of claim 2 in which said means having a high input resistance is a field effect transistor.

5. The device of claim 4 in which said unidirectional conducting means is a diode.

References Cited by the Examiner

UNITED STATES PATENTS

| | | | |
|---|---|---|---|
| 3,051,841 | 8/1962 | Crosfield et al. | 88—14 |
| 3,204,117 | 8/1965 | Wood | 307—88.5 |

ARCHIE R. BORCHELT, *Primary Examiner.*